(12) United States Patent
Appleton et al.

(10) Patent No.: US 6,663,877 B1
(45) Date of Patent: Dec. 16, 2003

(54) ANTIBACTERIAL SOLID SURFACE MATERIALS WITH RESTORABLE ANTIBACTERIAL EFFECTIVENESS

(75) Inventors: Gerry Thorn Appleton, Hockessin, DE (US); Nell Lynn Gosser, Port Angeles, WA (US); Bruce Neal Vogel, Landenberg, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/442,020

(22) Filed: Nov. 17, 1999

Related U.S. Application Data

(63) Continuation-in-part of application No. 08/977,545, filed on Nov. 25, 1997, now abandoned, which is a continuation-in-part of application No. 08/670,471, filed on Jun. 26, 1996, now abandoned.

(51) Int. Cl.[7] .............................................. A01N 25/34
(52) U.S. Cl. ...................... 424/411; 424/405; 424/406; 424/409; 424/421; 424/78.31; 424/601; 424/602; 424/617; 424/618; 424/630; 424/635; 424/641; 424/683; 424/684; 424/724; 523/122
(58) Field of Search ................................. 424/405, 409, 424/411, 421, 617, 618, 78.31, 78.37, 601, 641, 602, 630, 635, 690, 691, 724, 682–684, 406; 514/495; 523/122, 149; 510/199, 243, 244

(56) References Cited

U.S. PATENT DOCUMENTS

| | | | |
|---|---|---|---|
| 3,847,865 A | 11/1974 | Duggins | 260/42.52 |
| 4,615,705 A | 10/1986 | Scales et al. | 623/11 |
| 5,454,886 A | 10/1995 | Burrell et al. | 148/565 |
| 5,468,738 A | 11/1995 | Okabayashi et al. | 514/63 |
| 5,503,840 A | 4/1996 | Jacobson et al. | 424/421 |
| 5,567,745 A | 10/1996 | Minghetti et al. | 523/202 |

FOREIGN PATENT DOCUMENTS

| | | | |
|---|---|---|---|
| JP | 2-124949 | 5/1990 | C08K/3/22 |
| JP | 4-93360 | 3/1992 | C08L/101/00 |
| JP | 5-25319 | 2/1993 | C08K/5/46 |
| JP | 5-058698 | 3/1993 | C04B/26/06 |
| JP | 93-316700 | 3/1993 | |
| JP | 5-140331 | 6/1993 | C08J/5/00 |
| JP | 5-295127 | 11/1993 | C08J/5/00 |
| JP | 7-266522 | 10/1995 | B32B/27/36 |
| WO | 97/01515 | 1/1997 | C04B/26/06 |
| WO | 97/49761 | 1/1997 | C08K/11/00 |

OTHER PUBLICATIONS

JP05 058 698 A, Database WPI, Section Ch, Week 9315, Derwent Publications Ltd., London, GB, AN 93–121114, Isuzu Motors Ltd., Mar. 9, 1993.

Saito, M., Antibacterial, Deodorizing, and UV Absorbing Materials Obtained with Zinc Oxide (ZnO) Coated Fabrics, Journal of Coated Fabrics, vol. 23, pp. 150–164, Oct. 1993.

JP 07 266 522 A, Database WPI, Section Ch, Week 9550, Derwent Publications Ltd., London, GB, AN 95–389551, Nippon Sheet Glass Co., Ltd., Oct. 17, 1995.

*Primary Examiner*—Neil S. Levy

(57) ABSTRACT

A solid surface material with a filler and an antibacterial agent in a thermoset or thermoplastic matrix, which has antibacterial effectiveness that can be restored when lost or diminished with time and use.

5 Claims, No Drawings

ANTIBACTERIAL SOLID SURFACE MATERIALS WITH RESTORABLE ANTIBACTERIAL EFFECTIVENESS

RELATED APPLICATIONS

This is a continuation-in-part of U.S. patent applicatin Ser. No. 08/977,545, filed Nov. 25, 1997, ABD which is a continuation-in-part of U.S. patent application Ser. No. 08/670,471 filed Jun. 26, 1996, ABD.

BACKGROUND OF THE INVENTION

1. Field of Invention

This invention is directed to solid surface materials having antibacterial properties.

2. Description of the Related Art

Artificial (or synthetic) marble can be considered as a general designation for various types of materials used as building products, such as bathroom vanity tops, sinks, shower stalls and kitchen counter tops, for example; furniture; sanitary use; lining materials; and stationary small articles. Also, from a viewpoint that the artificial marble is clean and neat, it has recently been used in hospitals, nursing homes, as well as commercial and residential food preparation facilities etc. Artificial marbles encompass cultured marble, onyx and solid surface materials typically comprising some kind of resin matrix and either with or without a filler present in the resin matrix. Typically, cultured marble consists of a gel coating of unfilled unsaturated polyester on a substrate of a filled unsaturated polyester, the filler generally being calcium carbonate, or the like. Onyx typically consists of a similar unfilled gel coat on a substrate of filled unsaturated polyester, the filler being alumina trihydrate (ATH). Solid surface materials are typically filled resin materials and, unlike cultured marble or onyx, do not have a gel coat. Corian® material available from E. I. du Pont de Nemours and Company, Wilmington, Del. (DuPont) is a solid surface material comprising an acrylic matrix filled with ATH.

As evidenced by the presence in the market of numerous materials for eliminating or minimizing human contact with bacteria, there is clearly a demand for materials and/or processes that either minimize or kill bacteria encountered in the environment. Such materials are useful in areas of food preparation or handling and in areas of personal hygiene, such as bathrooms. Similarly, there is a use for such antibacterial materials in hospitals and nursing homes where people with lowered resistance are especially vulnerable to bacteria.

Cultured marbles have been developed wherein an antibacterial agent has been incorporated in the gel coat, but not through the matrix of the substrate. Such materials have been disclosed in Japanese Patent Application Publication Kokai: 7-266522. However, such materials have a relatively thin gel coat, typically in the order of 15 mils and, as such, when the gel coat is depleted of antibacterial agent or the gel coat wears away or is otherwise removed, the antibacterial effect is significantly decreased or lost entirely.

With regard to solid surface materials consisting of either an unsaturated polyester resin or an epoxy resin there has not been any use of an antibacterial agent included throughout the resin.

SUMMARY OF THE INVENTION

This invention is directed to a solid surface material with an outer surface having a restorable antibacterial effectiveness. This solid surface material includes a matrix of at least one resin, at least one filler dispersed in the matrix, and at least one antibacterial agent dispersed in the matrix. The resin can be thermoset, thermoplastic, or combinations thereof. The antibacterial agent is present in an amount that provides an outer surface of the solid surface material with an antibacterial effectiveness within about 24 hours. The antibacterial agent can be an inorganic compound, an organic compound, or a combination thereof. It has been found that the outer surface has an antibacterial effectiveness which can diminish and that the antibacterial effectiveness can be restored by removing a portion the outer surface, preferably by abrading the outer surface.

The present invention also relates to a method for restoring the antibacterial effectiveness of a solid surface material of the present invention, wherein the solid surface material has an outer surface, at an initial time ($t_0$), with an initial antibacterial activity value within 24 hours of sample incubation ($\Delta_{r0}$@24 h) that is greater than zero, wherein at a first later time ($t_1$), wherein $t_1 > t_0$, the outer surface has a first later antibacterial activity value within 24 hours of sample incubation ($\Delta_{r1}$@24 h) wherein ($\Delta_{r1}$@24 h) is less than ($\Delta_{r0}$@24 h), the method comprising: at a second later time ($t_2$), wherein $t_2 > t_1$, actively removing a portion of the outer surface of the solid surface material to provide a second outer surface on the solid surface material, the second outer surface having a second later antibacterial activity value within 24 hours of sample incubation ($\Delta_{r2}$@24 h) such that it satisfies the Equation I below:

$$(\Delta_{r2}@24\ h) > 0 \text{ and } (\Delta_{r2}@24\ h) > (\Delta_{r1}@24\ h) \qquad \text{Equation (I);}$$

wherein the active removal step can be repeated whenever necessary to continuously restore the antibacterial effectiveness of the solid surface material.

In a preferred embodiment, the restoration method includes at least one active removal step, which can be achieve by abrading or ablating away the surface.

DETAILED DESCRIPTION OF THE PREFERRED EMBODIMENTS

The artificial marbles of the present invention are made from a curable composition containing at least one antibacterial agent. The artificial marble materials of this invention are effective in inhibiting or destroying many common bacteria encountered in the home, and health care or food preparation environments. The term "antibacterial" is understood to be interchangeable with the term "antimicrobial" and other such like terms as would be familiar to one of ordinary skill. The term "antibacterial effectiveness" is intended to mean that, given a sufficient amount of antibacterial agent, the microbial concentration of a sample is decreased by at least about 30% over a period of time. It is known that the actual antibacterial effectiveness of an antibacterial agent depends upon the specific resin matrix used and the specific bacteria tested. The term "artificial marble" has been defined in the previous section. The term "solid surface materials" include those useful for decorative solid surfaces such as, for example, those used as building products, such as bathroom vanity tops, sinks, shower stalls and kitchen counter tops; furniture; sanitary use; lining materials; and articles such as office supplies.

The types of resin matrices useful in the present invention include both thermoplastic resins, thermoset resins and combinations thereof. Examples of thermoplastic resins include olefins, such as low and high density polyethylene and polypropylene; dienes, such as polybutadiene and Neoprene® elastomer; vinyl polymers, such as polystyrene, acrylics, and polyvinyl chloride; fluoropolymers, such as polytetrafluoroethylene; and heterochain polymers, such as polyamides, polyesters, polyurethanes, polyethers, polyacetals and polycarbonates. Examples of thermoset resins include phenolic resins, amino resins, unsaturated polyester resins, epoxy resins, polyurethanes and silicone polymers.

Epoxy resins useful in the present invention include those based on epoxide groups having certain reactivity. Such materials may include epoxy resins of bisphenol type A, bisphenol type F, phenol novolak type, alicyclic epoxy, halogenated epoxy, and cycloaliphatic epoxy resins.

Unsaturated polyester resins useful in the present invention include those wherein the reactivity is based on the presence of double or triple bonds in the carbon atoms. Unsaturated polyester resins are formed by the reaction of molar amounts of unsaturated and saturated dibasic acids or anhydrides with glycols. The unsaturation sites can then be used to cross-link the polyester chains, via vinyl containing monomers such as styrene, into a thermoset plastic state.

As is known to those of ordinary skill in the art, there can be many additives to epoxy or unsaturated polyesters. Typically, such materials are cured by adding cross-linking agents and catalysts to enhance the crosslinking action.

Acrylic resins useful in the present invention are not specially limited as long as it can be formed into an acrylic solid surface material by curing. Examples of useful acrylic resins include various kinds of conventional acrylic group monomers, acrylic group partial polymers, vinyl monomers for copolymerization other than acrylic group monomers, or partial polymers. As the acrylic group monomer, (meth) acrylic ester is preferable. Also, in this specification, "(meth) acrylic" means "acrylic and/or methacrylic".

Examples of (meth)acrylic esters include methyl (meth) acrylic ester, ethyl (meth)acrylic ester, butyl (meth)acrylic ester, 2-ethylhexyl (meth)acrylic ester, benzyl (meth)acrylic ester, glycidyl (meth)acrylic ester.

An example of a useful solid surface materials including acrylic resin is the Corian® material, which includes a poly(methyl methacrylate) (PMMA) resin with ATH as a filler. Corian® material can contain pigments, reground Corian® material in particulate form and other additives as can be found in U.S. Pat. Nos. 3,847,865 and 4,085,246, both of which are incorporated by reference.

In accordance with the present invention, at least one antibacterial agent is dispersed in the matrix in an amount that provides the solid surface material with an outer surface that has an antibacterial effectiveness. The antibacterial agent is provided in an amount that results in an outer surface having an antibacterial effectiveness within about 24 hours. The amount of antibacterial agent is preferably at least about 0.1% by weight of the precured total composition and more preferably at least about 0.5% by weight of the precured total composition. Antibacterial agents can be inorganic or organic. Types of inorganic antibacterial agents that are useful in the present invention include, but are not limited to metals and metal oxides, preferably silver, copper and zinc; metal phosphates; and metal zeolites. Specific examples of inorganic antibacterial agents include zinc oxide powder, a mixture of zinc oxide (about 70%) and partially silver and sodium ion-exchanged zirconium phosphate (about 30%), such as those available under the tradename Novaron AGZ330 (hereafter Novaron), available from Toagosei Co., Ltd., Tokyo, Japan; a mixture of zeolite and silver oxide/zinc oxide, such as those available under the tradename Zeomic, available from Shinanen Zeomic Co. Ltd., Nagoya, Japan; a mixture of calcium phosphate and zinc oxide, silver-copper zeolites, silver-zinc zeolites or silver zeolites, such as those available under the tradename Bactekiller AC, Bactekiller AZ and Bactekiller A, respectively, by Kaneko Ltd., Osaka, Japan and compounds as described in U.S. Pat. No. 5,180,085, which are inorganic core particles having a first coating of a metal or metal compound with a second coating of silica, silicate, borosilicate, alumino-silicate, alumina, aluminum phosphate, or mixtures thereof, wherein the inorganic core particles can be any of the oxides of titanium, aluminia, zinc or copper; or sulfates of calcium, strontium or barium; zinc sulfide; copper sulfide; zeolite; mica; talc; kaolin; mullite; or silica and wherein the metal or metal compounds of the first coating comprise silver, silver oxide, silver halide, copper, copper (I) oxide, copper (II) oxide, copper sulfide, zinc oxide, zinc sulfide, zinc silicate, and mixtures thereof. The metal or metal compounds and also the second coating can be present in amounts of 0.05 to 20% by weight based on the core particles. Examples of such antibacterial agents are Microfree® brand AMP-T588 (T588) which is silver, copper oxide and zinc silicate coated on titanium dioxide and overcoated with silica and aluminum hydroxide; and Microfree® brand AMP-Z200 (Z200) which is silver coated on zinc oxide and overcoated with silica and aluminum hydroxide, all of which were developed by DuPont; and Apacider AW, which is a zinc phosphate and calcium phosphate with admixture of silver and silica, available from Sangi Company Ltd., Tokyo, Japan. Types of organic antibacterial agents that are useful in the present invention include, but are not limited to halogenated compounds, phenols, quaternary ammonium salts, organotin compounds, phosphoric acids and phosphoric acid esters. Specific examples of organic antibacterial agents include the bis(2-ethylhexyl)ester of phosphoric acid with 2,2'-(cocoalkylimino)bis(ethanol) available under the tradename Intersept® from Interface, Kennesaw, GA or 3,5,3',4'-tetrachloro-salicylanilide, available under the tradename Irgasan® from Ciba (formerly Ciba Geigy) of Greensboro, N.C., 5-chloro-2-(2,4-dichloro-phenoxy)phenol, available under the trademark Microban® from Microban Products Company of Huntersville, N.C. It is understood that the present invention encompasses the use of inorganic and organic antibacterial agents either alone or in any combination.

In case zinc oxide powder is used alone, its average particle diameter is preferably about 0.2–100 $\mu$m, more preferably about 0.2–50 $\mu$m, and especially preferably about 0.2–10 $\mu$m. The amount of antibacterial agent to be used is more preferably about 0.1–10.0 percent by weight based on the weight of the precured total composition. Furthermore, the lower limit of the amount to be used is preferably at least about 0.3 percent by weight, more preferably at least about 0.5 percent by weight, based on the weight of the precured total composition. The upper limit is preferably at most about 8.0 parts by weight, based on the weight of the precured total composition.

Fillers useful in the present invention include, for example, ATH, alumina monohydrate(AMH), Bayer hydrate (BayH), silica ($SiO_2$), magnesium hydroxide ($Mg(OH)_2$), calcium carbonate ($CaCO_3$), barium sulfate ($BaSO_4$) or decorative agents, as a list that is not exhaustive and not intended to limit the invention. Fillers can be present in effective amounts from as low as about 20% up to about 75% by weight. Typically, but not necessarily, the amount of filler is decreased by the weight percent of antibacterial agent added.

It has been found that solid surface material containing PMMA with ATH as a filler exhibited a synergistic effect when certain zinc oxide-containing antibacterial agents were added to the acrylic matrix. In particular, acrylic artificial marble including zinc-oxide containing antibacterial agents have been found to have antibacterial characteristics against methicillin-resistant staphylococcus aureus (MRSA). In addition using certain other fillers and/or certain other antibacterial agents in resin matrix of the present invention other than PMMA also achieved an antibacterial effectiveness in solid surface materials.

It is known to include in solid surface materials other additives such as pigments, dyes, flame retardant agents, parting agents, fluidizing agents, viscosity control agents, curing agents, antioxidants, and the like as may be known to those of ordinary skill in the art.

Solid surface materials of this invention are typically produced by casting into a sheet form or casting into a shape form such as a sink, for example. Solid surface materials of this invention can also be produced by, for example, compression molding, injection molding or extrusion.

The problem of loss of antibacterial effectiveness in solid surface materials had not been previously addressed. It was found that the solid surface materials of this invention can lose some or all antibacterial effectiveness with time and use when an outer surface is exposed to, for example, common household or commercial cleaning agents, other liquids or heat. An outer surface is considered here to be the surface that is exposed to the environment and that is subject to use, for example, the exposed surface of a countertop. It has been discovered in accordance with this invention that the antibacterial effectiveness which is diminished with time and use can be restored by removing a portion of the outer surface of the sheet or shape.

"Removing a portion of the outer surface" can be achieved by any active removal methods, including, for example, abrading or ablating away the surface. In addition, "removing a portion of the outer surface" further includes breaking the solid surface material apart and thereby exposing a new, previously unexposed, surface.

Abrading is the physical removal of the surface, and can be achieved with actions such sanding (as with an abrasive), grinding (as with a material having a higher hardness value than the surface), planing (which includes chipping and scalping, as with a planer tool), routing (as with a router tool), blasting (as with a blasting material), and combinations thereof. The accepted definitions of these previous terms, exemplifying abrading, can be found in the Webster's Third New Internaiontal Dictionary (Merriam-Webster Inc. 1986). Examples of useful abrasive or grinding material include sand paper and a sponge-form grinder (e.g., Scotch-Brite® Sponge, available from 3M of St. Paul, Minn.). Removal by planing is often used to remove portions of a planar surface, whereas removal by routing is often used to remove portions of an edge surface. Removal by blasting can be accomplished using any blasting material that can be "blasted" against a surface and thereby remove the top layer. Examples of blasting materials include, but are not limited to, sand, ground walnut shells, any ground polymer such as ground polymethylmethacrylate and ground filled polymers, and ground glass.

Removal by ablation includes chemical removal or removal by energy impingement. Chemical removal of the surface can be achieved with actions such as chemical etching. Chemical etching involves the use of a chemical compound capable of chemically reacting with the solid surface material. For example, suitable etchants for Corian® solid surface include, but are not limited to, methyl ethyl ketone (MEK), acetone, N-methylpyrrolidone. Removal by energy impingement can be achieved using a laser. When a laser energy source is used, the laser beam generated is applied to the portion of the outer surface that is intended to be removed. The frequency and intensity of the energy supplied to the material affects the amount of surface removal.

Preferably, restoration of the antibacterial effectiveness ("restoration") is achieved by abrading the outer surface with an abrading material including components having a hardness greater than the cured product. Preferably, the restoration removes between about 1 and about 28 microns, more preferably between about 2.5 and about 25 microns, even more preferably between about 10 and about 25 microns of thickness from the outer surface. A useful tool of determining the amount of abrading required is to place a mark on the surface with a permanent marker, and abrading until the mark is completely removed. Of course, it is understood that only abradable surfaces can be restored in accordance to the present invention.

Additional features of the invention are illustrated by the following Examples.

EXAMPLES

Testing Method For Examples 1–58, 64–67

The antibacterial effectiveness of the various embodiments of this invention were evaluated by using the Shake Flash Test Procedure (SFTP). This procedure is particularly useful for immobilized or slowly diffusing antibacterial agents as opposed to test methods which depend on a rapid rate of leaching of the antibacterial agent from the treated material. The SFTP ensures good contact between the bacteria and the treated material accomplished by constant agitation of the test sample in a buffer during a test period.

The samples for testing the solid surface materials were provided as 2.5×2.5×1.3 cm blocks. In each test a control sample without any antibacterial agent was provided, or as otherwise described to provide appropriate comparison to the examples of the invention.

The bacterial inoculum for the Shake Flask Test was prepared by transferring 2.0 mL of an overnight broth culture to a 300 mL nephyloculture flask containing 100 mL of Tryptic Soy Broth (TSB) (BBL, Cockeysville, Md.). This flask was incubated at 35–37° C. with shaking (ca. 200 rpm). Growth of the culture was determined during incubation using a Klett-Summerson Photoelectric Colorimeter (Klett Manufacturing Co., New York, NY). When the culture reached late-log phase (170–190 Klett units for *Escherichia coli* (*E. coli*) ATCC 25922), appropriate dilutions were made with sterile 0.2 mM phosphate buffer (pH 7.2) to yield a final cell concentration of approximately $10^5$ colony forming units per milliliter (cfu/mL).

This inoculum was then placed into sterile, disposable 250 mL Erlenmeyer flasks containing one block (2.5×2.5 cm) of the test material or suitable control. Each flask contained a known concentration of bacteria in a volume of 75 mL phosphate buffer.

The initial concentration of bacteria was determined by serial dilution of the inoculum in 0.2 mM phosphate buffer, pH 7.2, and plating in duplicate on Trypticase Soy Agar (TSA) (BBL, Cockeysville, Md.). The flasks were shaken on a Burrell Wrist Action Shaker (Burrell Corp., Pittsburgh, Pa.) at room temperature. A 1.2 mL aliquot was removed from each flask after shaking for either 1 or 4 hours. Duplicate petri plates containing TSA were inoculated via spread plating with 0.1 mL each of the aliquot. The remaining 1.0 mL was serial diluted and plated in duplicate. The TSA plates were incubated at 35° C. for 18–24 hours. Plates having between 30 and 300 colonies were counted and the bacterial concentration determined from the mean of the plate counts, correcting for the dilution factor. If none of the plates contained at least 30 colonies, whichever plates contained the most colonies were counted. The limit of detection of this plate count method is 10 cfu/mL. Below this limit of detection, the colony count was said to be zero.

The antibacterial activity was expressed by use of the following formulas:

$$K_t = \log_{10}(C) - \log_{10}(Ct+1)$$

$$\Delta_t = \log_{10}(CFt) - \log_{10}(Ct+1)$$

where:

Co = initial concentration of bacterial (cfu/mL) in test flask at time zero,

Ct = concentration of bacterial (cfu/mL) in test flask at time t (one is added to the number to avoid calculating the log of zero), CFt = concentration of bacterial (cfu/mL) in control flask at time t.

The relationship between percent reduction and log reduction is conveniently seen by reference to the following:

| Value | % Reduction |
|-------|-------------|
| 1 | 90 |
| 2 | 99 |
| 3 | 99.9 |
| 4 | 99.99 |
| 5 | 99.999 |

Statistical calculations of antibacterial efficacy should be based on the exponential $K_t$ and $\Delta_t$ values, not the percent reduction values, which are provided for information purposes. Use of percent reduction values would give erroneous results.

In the data presented in the tables to follow, $K_t$ and $\Delta_t$ values at 1 h were not presented as they typically showed only insignificant changes from the initial bacterial density.

Materials Used In Examples 1–58, 64–67

The Examples reflect testing solid surface materials having either acrylic (PMMA), unsaturated polyester (UPE), or epoxy as a matrix material with various fillers and antibacterial agents as indicated in the following tables. The PMMA was a Corian® material obtainable from DuPont, as described in U.S. Pat. No. 3,847,865. UPE used was Polylite® 32166-15 available from Reichhold Chemicals Incorporated, Research Triangle Park, N.C. Epoxy used was Polypoxy 1010 available from Polytek Development Corp. of Easton, Pa.

Corian® material without any antibacterial agent included is presented as a control. The test bacteria was *E. coli*. The percentages given here and elsewhere in the application reflect weight percent based on the total weight of resin plus filler plus antibacterial agent (precured composition), unless otherwise indicated.

Examples 1–10

The following examples reflect the effectiveness against *E. coli* of different resins with different fillers and with or without additives of any antimicrobial agent. In this example the effectiveness after 24 hours is shown.

TABLE 1

| Sample | Resin | %/Filler | %/AB[1] | Initial CFU/mL | Average CFU/mL @ 24 h | $K_t$ @ 24 h | $\Delta_t$ @ 24 h |
|--------|-------|----------|---------|----------------|----------------------|--------------|-------------------|
| Control | PMMA | 60/ATH | — | 9.40 × 10⁴ | 5.38 × 10⁵ | −0.76 | 0 |
| Ex. 1 | PMMA | 60/ATH | 5.0/T558 | 9.40 × 10⁴ | 0 | 4.97 | 5.72 |
| Ex. 2 | PMMA | 60/ATH | 5.0/Z200 | 9.40 × 10⁴ | 1.68 × 10⁴ | 0.75 | 1.50 |
| Ex. 3 | PMMA | 60/ATH | 5.0/Z200 | 9.40 × 10⁴ | 3.45 × 10⁴ | 0.44 | 1.18 |
| Ex. 4 | UPE | 60/ATH | 5.0/T558 | 9.40 × 10⁴ | 0 | 4.97 | 5.72 |
| Ex. 5 | EPOXY | 60/ATH | 5.0/Z200 | 9.40 × 10⁴ | 4.78 × 10² | 2.29 | 3.06 |
| Control | PMMA | 60/ATH | — | 2.14 × 10⁵ | 4.15 × 10⁵ | −0.29 | 0 |
| Ex. 6 | EPOXY | 60/CaCO₃ | 5.0/T558 | 2.14 × 10⁵ | 5.05 × 10² | 2.63 | 2.74 |
| Ex. 7 | PMMA | 61/ATH | 4.0/Bactekiller* | 2.14 × 10⁵ | 0 | 5.33 | 5.62 |
| Ex. 8 | PMMA | 60/CaCO₃ | 0.5/Novaron | 2.14 × 10⁵ | 4.28 × 10⁵ | −0.30 | −0.01 |
| Ex. 9 | PMMA | 60/Polar CaCO₃ | 5.0/Z200 | 2.14 × 10⁵ | 5.90 × 10⁴ | 0.56 | 0.85 |
| Ex. 10 | PMMA | 61.5/ATH | 3.5/T558 | 2.14 × 10⁵ | 2.00 × 10¹ | 4.01 | 4.30 |

[1]AB = antibacterial agent
* Bactekiller = Bactekiller AC

The results in the foregoing table indicate that effective antimicrobial agents are Novaron, Bactekiller AC, Z200 and T558. The T558 was found to be effective to some extent with various resins and fillers. The Bactekiller AC was very effective in the ATH-filled acrylic.

Examples 11–24

The following examples reflect the effectiveness against *E. coli* of different resins with different fillers and with or without additives of any antimicrobial agent. In this example the effectiveness after 4 hours was also evaluated in addition to after 24 hours as above.

then subjected to the SFTP for effectiveness against *E. coli*. After shaking with the cleaners and before testing for antibacterial effectiveness, the samples were washed with three changes of 100 mL of deionized water and then were shaken for 5 min. in another change of 100 mL of deionized water.

The following cleaners were used: Sunlight® dish washing soap (diluted 1:600 in water) (hereinafter Sunlight), Windex® with Ammonia D (undiluted) (hereafter Windex), Lysol® Basin, Tub & Tile Cleaner (undiluted) (hereafter Lysol), and Tilex® Soap Scum Remover (undiluted) (hereinafter Tilex). The household cleaners all demonstrated very effective antibacterial characteristics; however, the

TABLE 2

| Sample @ 4 h | Resin | %/Filler | %/AB | Initial CFU/mL | Avg. CFU/mL @ 4 h | $K_t$ @ 4 h | $\Delta_t$ @ 4 h |
|---|---|---|---|---|---|---|---|
| Control | PMMA | 60/ATH | — | $3.28 \times 10^5$ | $1.75 \times 10^5$ | 0.27 | 0 |
| Ex. 11 | PMMA | 62.7/ATH | 0.5/Novaron | $3.28 \times 10^5$ | $3.10 \times 10^4$ | 1.02 | 0 |
| Ex. 12 | PMMA | 65/Mg(OH)$_2$ | — | $3.28 \times 10^5$ | $1.72 \times 10^5$ | 0.28 | 0 |
| Ex. 13 | PMMA | 61.5/Mg(OH)$_2$ | 3.5/T558 | $3.28 \times 10^5$ | $1.56 \times 10^5$ | 0.32 | 0 |
| Ex. 14 | PMMA | 65/AMH | — | $3.28 \times 10^5$ | $2.33 \times 10^5$ | 0.15 | 0 |
| Ex. 15 | PMMA | 61.5/AMH | 3.5/T558 | $3.28 \times 10^5$ | $2.50 \times 10^0$ | 4.97 | 4.82 |
| Ex. 16 | PMMA | 65/Bay H | — | $3.28 \times 10^5$ | $2.15 \times 10^5$ | 0.18 | 0 |
| Ex. 17 | PMMA | 61.5/Bay H | 3.5/T558 | $3.28 \times 10^5$ | $2.75 \times 10^4$ | 1.08 | 0.89 |
| Ex. 18 | PMMA | 65/SiO$_2$ | — | $3.28 \times 10^5$ | $2.37 \times 10^5$ | 0.14 | 0 |
| Ex. 19 | PMMA | 61.5/SiO$_2$ | 3.5/T558 | $3.28 \times 10^5$ | 0 | 5.52 | 5.37 |
| Control | PMMA | 60/ATH | — | $2.88 \times 10^5$ | $1.88 \times 10^5$ | 0.19 | 0 |
| Ex. 20 | PMMA | 62.7/ATH | 0.5/Novaron | $2.88 \times 10^5$ | $1.49 \times 10^5$ | 0.29 | 0.10 |
| Ex. 21 | UPE | 65/ATH | — | $2.88 \times 10^5$ | $1.58 \times 10^5$ | 0.26 | 0 |
| Ex. 22 | UPE | 61/ATH | 4.0/T558 | $2.88 \times 10^5$ | 0 | 5.46 | 5.20 |
| Ex. 23 | UPE | 65/ATH | — | $2.88 \times 10^5$ | $2.01 \times 10^5$ | 0.16 | 0 |
| Ex. 24 | UPE | 61/ATH | 4.0/T558 | $2.88 \times 10^5$ | 0 | 5.46 | 5.30 |

TABLE 3

| Sample | Resin | %/Filler | %/AB | Initial CFU/mL | Avg. CFU/mL @ 24 h | $K_t$ @ 24 h | $\Delta_t$ @ 24 h |
|---|---|---|---|---|---|---|---|
| Control | PMMA | 60/ATH | — | $3.28 \times 10^5$ | $6.78 \times 10^5$ | −0.32 | 0 |
| Ex. 11 | PMMA | 62.7/ATH | 0.5/Novaron | $3.28 \times 10^5$ | 0 | 5.52 | 5.83 |
| Ex. 12 | PMMA | 65/Mg(OH)$_2$ | — | $3.28 \times 10^5$ | $1.50 \times 10^5$ | 0.34 | 0 |
| Ex. 13 | PMMA | 61.5/Mg(OH)$_2$ | 3.5/T558 | $3.28 \times 10^5$ | $1.52 \times 10^4$ | 1.33 | 0.99 |
| Ex. 14 | PMMA | 65/AMH | — | $3.28 \times 10^5$ | $1.10 \times 10^6$ | −0.53 | 0 |
| Ex. 15 | PMMA | 61.5/AMH | 3.5/T558 | $3.28 \times 10^5$ | 0 | 5.52 | 6.04 |
| Ex. 16 | PMMA | 65/Bay H | — | $3.28 \times 10^5$ | $5.60 \times 10^5$ | −0.23 | 0 |
| Ex. 17 | PMMA | 61.5/Bay H | 3.5/T558 | $3.28 \times 10^5$ | $1.55 \times 10^3$ | 2.33 | 2.56 |
| Ex. 18 | PMMA | 65/SiO$_2$ | — | $3.28 \times 10^5$ | $8 \times 10^5$ | −0.39 | 0 |
| Ex. 19 | PMMA | 61.5/SiO$_2$ | 3.5/T558 | $3.28 \times 10^5$ | 0 | 5.52 | 5.90 |
| Control | PMMA | 60/ATH | — | $2.88 \times 10^5$ | $3.53 \times 10^5$ | −0.09 | 0 |
| Ex. 20 | PMMA | 62.7/ATH | 0.5/Novaron | $2.88 \times 10^5$ | $2.50 \times 10^0$ | 4.92 | 5.00 |
| Ex. 21 | UPE | 65/ATH | — | $2.88 \times 10^5$ | $5.18 \times 10^5$ | −0.25 | 0 |
| Ex. 22 | UPE | 61/ATH | 4.0/T558 | $2.88 \times 10^5$ | 0 | 5.46 | 5.71 |
| Ex. 23 | UPE | 65/ATH | — | $2.88 \times 10^5$ | $3.94 \times 10^5$ | −0.14 | 0 |
| Ex. 24 | UPE | 61/ATH | 4.0/T558 | $2.88 \times 10^5$ | 0 | 5.46 | 5.60 |

The results from Tables 2 and 3 above demonstrated that T558 is an effective antibacterial agent with different combinations of resins and filler.

Examples 25–36

It has been found that the effectiveness of solid surface materials degrades with time. However, it was discovered that this effectiveness could be re-stablished by abrading the outer surface of the various solid surface materials. To demonstrate the degradation of the antibacterial effectiveness, samples of Corian® with Novaron (Corian-N) were subjected to shaking for 24 hours in 75 mL of different types of household cleaning products as indicated below and extensive rinsing of the washed samples precluded the antibacterial effect of the cleaners in the SFTP.

TABLE 4

| Sample | Cleaner | Initial CFU/mL | Avg. 24 h CFU/mL | $K_t$ @ 24 h | $\Delta_t$ @ 24 h |
|---|---|---|---|---|---|
| Corian Control | Not washed | $2.00 \times 10^5$ | $8.00 \times 10^5$ | −0.60 | 0 |
| Corian-N Control | Not washed | $2.00 \times 10^5$ | 0 | 5.30 | 5.90 |
| Ex. 25 | Sunlight | $2.00 \times 10^4$ | $1.98 \times 10^5$ | 1.00 | 1.18 |

TABLE 4-continued

| Sample | Cleaner | Initial CFU/mL | Avg. 24 h CFU/mL | $K_t$ @ 24 h | $\Delta_t$ @ 24 h |
|---|---|---|---|---|---|
| Ex. 26 | Windex | $2.00 \times 10^5$ | $2.28 \times 10^5$ | −0.06 | 0.40 |
| Ex. 27 | Lysol | $2.00 \times 10^5$ | $3.18 \times 10^5$ | −0.20 | 0.16 |
| Ex. 28 | Tilex | $2.00 \times 10^5$ | $1.33 \times 10^5$ | 0.18 | 0.54 |

The table above shows that all of the household cleaners reduced the antibacterial effectiveness of Corian-N after washing for 24 hours in the various household cleaners. It was of interest to know at what point in time the sample began to lose antibacterial effectiveness. As such, samples were shaken in 75 mL Lysol for various periods of time as indicated in the following table and then tested for antibacterial effectiveness using the SFTP.

TABLE 5

| Sample | Wash Time (h) | Initial CFU/mL | Avg. 24 h CFU/mL | $K_t$ @ 24 h | $\Delta_t$ @ 24 h |
|---|---|---|---|---|---|
| Control | Not washed | $6.20 \times 10^4$ | 0 | 4.79 | 5.90 |
| Ex. 29 | 1 | $6.20 \times 10^4$ | 0 | 4.79 | 5.90 |
| Ex. 30 | 2 | $6.20 \times 10^4$ | 0 | 4.79 | 5.90 |
| Ex. 31 | 3 | $6.20 \times 10^4$ | 0 | 4.79 | 5.90 |
| Ex. 32 | 4 | $6.20 \times 10^4$ | 0 | 4.79 | 5.90 |
| Ex. 33 | 5 | $6.20 \times 10^4$ | 0 | 4.79 | 5.90 |
| Ex. 34 | 6 | $6.20 \times 10^4$ | 0 | 4.79 | 5.90 |
| Ex. 35 | 8 | $6.20 \times 10^4$ | $4.25 \times 10^1$ | 3.15 | 4.26 |
| Ex. 36 | 24 | $6.20 \times 10^4$ | $1.18 \times 10^4$ | 0.72 | 1.83 |

The table above demonstrates that the antibacterial effectiveness of Corian-N was not affected by washing in Lysol for up to 6 hours; however, a slight decrease in antibacterial effectiveness was noted at 8 hours with a significant decrease at 24 hours.

Examples 37–46

Samples of Corian-N were washed for 24 hours with household cleaners as above, and also in an industrial cleaner Roccal® H (hereafter Roccal) available from National Laboratories, Montvale, N.J. The samples were rinsed with four changes of 100 mL of deionized water and allowed to air dry. One of each pair of samples was sanded with 180 grit paper and the other was sanded with Scotch-Brite® (from 3M, St. Paul, Minn.) until the surface appeared dull. The samples were rinsed to remove dust from the sanding then patted dry. The samples were then submitted to the Shake Flask test. The test bacteria was *E. coli*.

TABLE 6

| Sample | Cleaner | Sanding Agent | Initial CFU/mL | Avg. 24 h CFU/mL | $K_t$ @ 24 h | $\Delta_t$ @ 24 h |
|---|---|---|---|---|---|---|
| Corian Control | — | — | $1.46 \times 10^5$ | $1.20 \times 10^6$ | −0.91 | 0 |
| Corian-N Control | — | — | $1.46 \times 10^5$ | 0 | 5.16 | 6.08 |
| Ex. 37 | Sunlight | 180 grit | $1.46 \times 10^5$ | $3.0 \times 10^1$ | 3.67 | 4.59 |
| Ex. 38 | Sunlight | ScotchBrite | $1.46 \times 10^5$ | $5.00 \times 10^0$ | 4.39 | 5.30 |
| Ex. 39 | Windex | 180 grit | $1.46 \times 10^5$ | $1.50 \times 10^1$ | 3.96 | 4.88 |
| Ex. 40 | Windex | ScotchBrite | $1.46 \times 10^5$ | 0 | 5.16 | 6.08 |
| Ex. 41 | Lysol | 180 grit | $1.46 \times 10^5$ | 0 | 5.16 | 6.08 |
| Ex. 42 | Lysol | ScotchBrite | $1.46 \times 10^5$ | 0 | 5.16 | 6.08 |
| Ex. 43 | Tilex | 180 grit | $1.46 \times 10^5$ | 0 | 5.16 | 6.08 |
| Ex. 44 | Tilex | ScotchBrite | $1.46 \times 10^5$ | 0 | 5.16 | 6.08 |
| Ex. 45 | Roccal | 180 grit | $1.46 \times 10^5$ | 0 | 5.16 | 6.08 |
| Ex. 46 | Roccal | ScotchBrite | $1.46 \times 10^5$ | 0 | 5.16 | 6.08 |

As can be seen from the table, sanding restored the antibacterial effectiveness completely after the samples had been washed in various cleaners including one of industrial strength.

Examples 47–58

Samples made from a variety of polymers, fillers, and antibacterial agents, as prepared in a manner similar to that described in Examples 37–46 above, were washed and sanded to test the loss and regaining of the antibacterial effectiveness. Some of the blocks were washed by shaking for 24 hours in 75 mL of Lysol and were then rinsed with four changes of 100 mL of deionized water, then allowed to air dry. Half of the blocks that had been washed were sanded with 180 grit paper and lightly rinsed. The washed blocks (sanded and unsanded) and the unwashed control blocks were submitted to the Shake Flask test as outlined above against *E. coli*. For convenience, due to the large number of samples, the results are presented in the following two tables.

TABLE 7

| Sample | Resin | w%/Filler | %/AB | Sample Condition | Initial CFU/mL | Avg. 24 h CFU/mL | $K_t$ @ 24 h | $\Delta_t$ @ 24 h |
|---|---|---|---|---|---|---|---|---|
| Corian Control | PMMA | 60/ATH | — | N/W | $1.17 \times 10^5$ | $3.09 \times 10^5$ | −0.42 | 0 |
| Corian-N Control | PMMA | 62.7/ATH | 0.5/Novaron | N/W | $1.17 \times 10^5$ | 0 | 5.07 | 5.49 |
| Ex. 47* | PMMA | 60/ATH | — | W | $1.17 \times 10^5$ | 0 | 5.07 | 5.49 |
| Ex. 48* | PMMA | 60/ATH | — | W/S | $1.17 \times 10^5$ | $2.55 \times 10^3$ | 1.66 | 2.08 |
| Ex. 49 | PMMA | 60/ATH | 5.0/T558 | W | $1.17 \times 10^5$ | $4.85 \times 10^2$ | 2.38 | 2.80 |
| Ex. 50 | PMMA | 60/ATH | 5.0/T558 | W/S | $1.17 \times 10^5$ | 0 | 5.07 | 5.49 |
| Ex. 51 | UPE | 60/ATH | 5.0/T558 | W | $1.17 \times 10^5$ | 0 | 5.07 | 5.49 |
| Ex. 52 | UPE | 60/ATH | 5.0/T558 | W/S | $1.17 \times 10^5$ | 0 | 5.07 | 5.49 |

N/W = not washed
W = washed, not sanded
W/S = washed and sanded

TABLE 7-continued

| Sample | Resin | w%/Filler | %/AB | Sample Condition | Initial CFU/mL | Avg. 24 h CFU/mL | $K_t$ @ 24 h | $\Delta_t$ @ 24 h |
|---|---|---|---|---|---|---|---|---|

*The sample smelled strongly of Lysol cleaner after washing and even after sanding. Therefore, it is presumed that an amount of Lysol cleaner was absorbed into the outer surface.

TABLE 8

| Sample | Resin | w%/Filler | %/AB | Sample Condition | Initial CFU/mL | Avg. 24 h CFU/mL | $K_t$ @ 24 h | $\Delta_t$ @ 24 h |
|---|---|---|---|---|---|---|---|---|
| Corian Control | PMMA | 60/ATH | — | N/W | $1.45 \times 10^5$ | $5.20 \times 10^5$ | −0.55 | 0 |
| Corian-N Control | PMMA | 62.7/ATH | 0.5/Novaron | N/W | $1.45 \times 10^5$ | 0 | 5.16 | 5.72 |
| Ex. 53 | EPOXY | 65/ATH | — | N/W | $1.45 \times 10^5$ | $1.96 \times 10^5$ | −0.13 | 0.42 |
| Ex. 54 | EPOXY | 65/ATH | — | W | $1.45 \times 10^5$ | $3.11 \times 10^5$ | −0.33 | 0.22 |
| Ex. 55 | EPOXY | 65/ATH | — | W/S | $1.45 \times 10^5$ | $3.41 \times 10^5$ | −0.37 | 0.18 |
| Ex. 56 | EPOXY | 60/ATH | 5.0/Z200 | N/W | $1.45 \times 10^5$ | $2.50 \times 10^0$ | 4.62 | 5.17 |
| Ex. 57 | EPOXY | 60/ATH | 5.0/Z200 | W | $1.45 \times 10^5$ | $9.35 \times 10^3$ | 1.19 | 1.74 |
| Ex. 58 | EPOXY | 60/ATH | 5.0/Z200 | W/S | $1.45 \times 10^5$ | 0 | 5.16 | 5.72 |

N/W = not washed
W = washed, not sanded
W/S = washed and sanded

The results from the table above show that generally those samples that exhibited antibacterial effectiveness also showed reduced effectiveness after washing, but effectiveness could be restored upon sanding.

Examples 59 And Comparative Example 1

A syrup composed of poly(methyl methacrylic ester) and methyl methacrylic ester (weight ratio=2:8) was prepared. The viscosity of the syrup at 25° C. was 50 cP.

In Example 59, 100 parts syrup and alumina tri-hydrate powder with an average particle diameter of 45 Fm (available from Nippon Light Metal Co., Ltd., Tokyo, Japan) in total (the ratio of alumina tri-hydrate is described in Table 9), 0.3 part tertiary-butylperoxymaleic acid (trade name, Perbutyl Mass., available from Nippon Oil and Fats Co., Ltd., Tokyo, Japan), 0.35 part ethylene glycol dimethacrylic ester (trade name, Acryester ED, available from Mitsubishi Rayon Co., Ltd., Tokyo, Japan), 0.15 part ethylene glycol dimercaptoacetate, 0.1 part deionized water, 0.9 part white pigment (titanium oxide), and a prescribed amount (described in Table 9) of zinc oxide (available from Sakai Chemical Co., Ltd., Osaka, Japan) with an average particle diameter of 0.55 μm as an antibacterial agent were mixed and degassed under vacuum with stirring. The vacuum-degassed mixture was cast into a mold and cured at room temperature, so that a sheet-form cured product with a thickness of 13 mm was obtained. Its surface was sanded with #120 sandpaper, and an acrylic artificial marble was obtained. The surface roughness was 1.7 μm.

In Comparative Example 1, as described in Table 9, similar to Application Example 1 except for adding either zinc oxide as the antibacterial agent or alumina tri-hydrate powder separately, an acrylic artificial marble was obtained.

As for the acrylic artificial marbles obtained in the above-mentioned Example 59 and Comparative Example 1, the anti-MRSA characteristics and the anticoliform bacteria characteristics were tested. The testing methods are as follows.

1) Test Bacteria
  Staphylococcus aureus IID 1677 (MRSA)
  Escherichia coli IFO 3301 (coliform bacteria)
  IID 1677 can be officially obtained from the Laboratory of the Medical Department of Tokyo University, and IFO 3301 can be officially obtained from Fermentation Research Foundation.

2) Preparation Of Bacterial Solution
  A culture solution of test bacteria cultivated under shaking at 35° C. for 16–20 hours (h) in an ordinary bouillon medium (available from Eiken Chemical Co., Ltd., Tokyo, Japan) was diluted 10,000 times with a sterilized phosphoric acid buffer solution, and it was used as a bacteria solution.

3) Test Operation
  0.5 mL bacteria solution was dropped on the test surface of a specimen, stored at 25° C. in a closed system, and after 6 h and 24 h, the number of live bacteria on the specimen was measured. Also, 0.5 mL bacteria solution was dropped into a sterilized plastic petri dish, and it was used as a comparative specimen. Testing was carried out similarly.

4) Number Of Live Bacteria
  The specimen and the comparative specimen were respectively washed out with 10 mL (soybean-casein digest broth with lecithin and polysorbate) SCDLP medium (available from Nihon Chemical Co., Ltd., Osaka, Japan), and the number of live bacteria was measured by a pour-plate culture method (culture at 35° C. for 48 h) using a standard agar medium and calculated per specimen and comparative specimen.

The result are shown in the following Tables 9 and 10.

TABLE 9

ANTI-MRSA TEST

| | | | | No. of Live Bacteria | |
|---|---|---|---|---|---|
| Specimen No. | Zinc Oxide | Alumina Tri-Hydrate | After the Start | After 6 h | After 24 h |
| Example 59 | | | | | |
| 1 | 0.5 | 50 | $1.0 \times 10^5$ | $3.7 \times 10^2$ | 60 |
| 2 | 0.5 | 58 | $1.0 \times 10^5$ | $2.5 \times 10^2$ | 60 |
| 3 | 0.5 | 60 | $1.0 \times 10^5$ | $3.0 \times 10^2$ | <10 |
| 4 | 0.5 | 62.7 | $1.0 \times 10^5$ | $3.2 \times 10^2$ | <10 |

TABLE 9-continued

ANTI-MRSA TEST

| | | | | No. of Live Bacteria | |
|---|---|---|---|---|---|
| Specimen No. | Zinc Oxide | Alumina Tri-Hydrate | After the Start | After 6 h | After 24 h |
| 5 | 0.5 | 65.2 | $1.0 \times 10^5$ | $2.0 \times 10^2$ | <10 |
| 6 | 0.5 | 68 | $1.0 \times 10^5$ | $1.5 \times 10^2$ | <10 |
| 7 | 0.5 | 70.2 | $1.0 \times 10^5$ | $1.0 \times 10^2$ | <10 |
| 8 | 1.0 | 62.7 | $1.0 \times 10^5$ | 20 | 10 |
| 9 | 3.0 | 62.7 | $1.0 \times 10^5$ | 10 | <10 |
| 10 | 5.0 | 62.7 | $1.0 \times 10^5$ | 20 | <10 |
| Comp. Ex. 1 | | | | | |
| 1' | 0 | 62.7 | $1.0 \times 10^5$ | $3.9 \times 10^5$ | $5.8 \times 10^5$ |
| 2' | 0.5 | 0 | $1.0 \times 10^5$ | $3.6 \times 10^3$ | $1.2 \times 10^3$ |
| Comp. Specimen | | | $1.0 \times 10^5$ | $2.2 \times 10^5$ | $7.5 \times 10^4$ |

TABLE 10

ANTICOLIFORM BACTERIA TEST (REFERENTIAL TEST)

| | | | | No. of Live Bacteria | |
|---|---|---|---|---|---|
| Specimen No. | Zinc Oxide | Alumina Tri-Hydrate | After the Start | After 6 h | After 24 h |
| Example 59 | | | | | |
| 8 | 1.0 | 62.7 | $1.0 \times 10^5$ | $6.5 \times 10^4$ | $1.1 \times 10^4$ |
| 9 | 3.0 | 62.7 | $1.0 \times 10^5$ | $4.8 \times 10^4$ | $1.5 \times 10^4$ |
| 10 | 5.0 | 62.7 | $1.0 \times 10^5$ | $4.4 \times 10^4$ | $9.4 \times 10^3$ |

As shown in Table 9, in Example 59, by using zinc oxide as an antibacterial agent with alumina tri-hydrate powder, an excellent anti-MRSA characteristic is exerted, whereas in Comparative Example 1, in which only one of them is added, a sufficient anti-MRSA characteristic cannot be obtained. Therefore, a synergistic effect appears to result from adding the zinc oxide antibacterial agent in an ATH-filled acrylic material. Also, the results shown in Table 10 show that an excellent effect is not exerted particularly in the anticoliform bacteria characteristics even by using both zinc oxide and alumina tri-hydrate. In other words, there are no anticoliform bacteria characteristics, but, there are anti-MRSA characteristics, which contrast shows the specificity of this invention.

Example 60 And Comparative Example 2

Similar to Example 59 and Comparative Example 1 except for using Novaron, an acrylic artificial marble was made, and the anti-MRSA characteristics were tested (after 6 h storage). The results are shown in the following Table 11.

TABLE 11

ANTI-MRSA TEST

| Specimen No. | Novaron | Alumina Tri-Hydrate | No. of Live Bacteria | |
|---|---|---|---|---|
| | | | After the Start | After 6 h |
| Example 60 | | | | |
| 11 | 0.5 | 20 | $1.0 \times 10^5$ | $2.5 \times 10^2$ |
| 12 | 0.5 | 30 | $1.0 \times 10^5$ | $3.1 \times 10^2$ |

TABLE 11-continued

ANTI-MRSA TEST

| Specimen No. | Novaron | Alumina Tri-Hydrate | No. of Live Bacteria | |
|---|---|---|---|---|
| | | | After the Start | After 6 h |
| 13 | 0.5 | 45 | $1.0 \times 10^5$ | 70 |
| 14 | 0.5 | 50 | $1.0 \times 10^5$ | <10 |
| 15 | 0.5 | 58 | $1.0 \times 10^5$ | <10 |
| 16 | 0.5 | 60 | $1.0 \times 10^5$ | <10 |
| 17 | 0.5 | 62.7 | $1.0 \times 10^5$ | <10 |
| 18 | 0.5 | 65.2 | $1.0 \times 10^5$ | <10 |
| 19 | 0.5 | 68 | $1.0 \times 10^5$ | <10 |
| 20 | 0.5 | 70.2 | $1.0 \times 10^5$ | <10 |
| 21 | 1.2 | 62.7 | $1.0 \times 10^5$ | 20 |
| 22 | 8.0 | 62.7 | $1.0 \times 10^5$ | <10 |
| Comp. Ex. 2 | | | | |
| 1' | 0 | 62.7 | $1.0 \times 10^5$ | $3.9 \times 10^5$ |
| 3' | 0.5 | 0 | $1.0 \times 10^5$ | $1.6 \times 10^5$ |

As shown in Table 11, in Example 60 using Novaron as an antibacterial agent and alumina tri-hydrate powder together, excellent anti-MRSA characteristics are exerted, whereas in Comparative Example 2 in which only one of them is added, sufficient anti-MRSA characteristics cannot be obtained. Therefore, this example again shows that a synergistic effect appears to result from adding the zinc oxide antibacterial agent in an ATH-filled acrylic material.

Example 61

Similar to Example 59 except for using zinc oxide with different particle diameter and purity available from Sakai Chemical Industry Co., Ltd., Osaka, Japan, that is (a) an average particle diameter of 0.26–0.28 $\mu$m and a purity of 99.5%, (b) an average particle diameter of 0.5–0.6 $\mu$m and a purity of 99.5%, and (c) an average particle diameter of 0.5–0.6 $\mu$m and a purity of 99.0%, an acrylic artificial marble was made and the anti-MRSA characteristics were tested. The results are shown in the following Table 12.

TABLE 12

ANTI-MRSA TEST

| Specimen No. | Zinc Oxide | Alumina Tri-Hydrate | No. of Live Bacteria | | |
|---|---|---|---|---|---|
| | | | After the Start | After 6 h | After 24 h |
| Example 61 | | | | | |
| 23 | (a)1.0 | 62.7 | $1.3 \times 10^5$ | 10 | <10 |
| 24 | (b)1.0 | 62.7 | $1.3 \times 10^5$ | <10 | <10 |
| 25 | (c)1.0 | 62.7 | $1.3 \times 10^5$ | $2.5 \times 10^2$ | <10 |

As shown in Table 12, similarly, excellent anti-MRSA characteristics are exerted even with changes in the particle diameter of the zinc oxide.

Example 62

Similar to Example 59 except for not using deionized water as an auxiliary catalyst for curing, an acrylic artificial marble was made, and the anti-MRSA characteristics were tested. The results are shown in the following Table 13.

TABLE 13

ANTI-MRSA TEST

| Specimen No. | Antibacterial Agent | Alumina Tri-Hydrate | After the Start | No. of Live Bacteria After 6 h | After 24 h |
|---|---|---|---|---|---|
| Example 62 | | | | | |
| 26 | Zinc Oxide 0.5 | 62.7 | $1.4 \times 10^5$ | $1.7 \times 10^2$ | <10 |
| 27 | Novaron 0.5 | 62.7 | $1.4 \times 10^5$ | <10 | |

As shown in Table 13, if an antibacterial agent containing zinc oxide and alumina tri-hydrate are used together, excellent anti-MRSA characteristics are exerted, regardless of the presence of the deionized water as an auxiliary catalyst for curing.

Example 63

A prefabricated artificial marble (the same one as that of Example 59 except for not containing the antibacterial agent) was ground, so that a granular-form substance of 7–10 mesh was obtained. Similarly to Example 60 except for adding 10–20 wt % (described in Table 14) granular-form substance to the total amount of mixture, an acrylic artificial marble was made, and the anti-MRSA characteristics were tested. The results are shown in the following Table 14.

TABLE 14

ANTI-MRSA TEST

| Specimen No. | Granular Form (%) | Novaron | Alumina Tri-Hydrate | After the Start | No. of Live Bacteria After 6 h | After 24 h |
|---|---|---|---|---|---|---|
| Example 63 | | | | | | |
| 28 | 10 | 0.5 | 62.7 | $1.3 \times 10^5$ | <10 | <10 |
| 29 | 15 | 0.5 | 62.7 | $1.3 \times 10^5$ | <10 | <10 |
| 30 | 20 | 0.5 | 62.7 | $1.3 \times 10^5$ | <10 | <10 |

As shown in Table 14, even in a case where 10–20 wt % of granular-form substance containing no antibacterial agent is added, similar favorable anti-MRSA characteristics are obtained.

Comparative Example 3

Similar to Example 59 except for using zinc sulfide instead of zinc oxide, an acrylic artificial marble was made, and the anti-MRSA characteristics and the anticoliform bacteria characteristics were tested. The results are shown in the following Table 15.

TABLE 15

ANTI-MRSA TEST AND ANTICOLIFORM BACTERIA TEST

| | Specimen No. | Zinc Sulfide | Alumina Tri-Hydrate | After the Start | No. of Live Bacteria After 6 h | After 24 h |
|---|---|---|---|---|---|---|
| Comp. Example 3 | 4' | 3.0 | 62.7 | (MRSA) $1.4 \times 10^5$ | $1.7 \times 10^5$ | $3.1 \times 10^4$ |
| | | | | (Coliform bacteria) $1.4 \times 10^5$ | $2.1 \times 10^5$ | $1.8 \times 10^6$ |

As shown in Table 15, it is understood that when zinc sulfide is used, an excellent effect similar to that of the present invention cannot be obtained at all.

Examples 64–67

These examples show the effect of resin matrix on the efficiency of the antibacterial agent. The antibacterial agent used was Irgasan DP 300 from Ciba Geigy, which is 5-chloro-2-(2,4-dichloro-phenoxy)phenol, also commonly known as Trichlosan.

TABLE 16

| Sample | Resin | %/Filler | %/AB | Initial CFU/mL | Avg. 24 h CFU/mL | Kt @ 24 h | $\Delta_t$ @ 24 h |
|---|---|---|---|---|---|---|---|
| control | PMMA | 65/ATH | — | $1.90 \times 10^5$ | $4.73 \times 10^5$ | −0.40 | 0.00 |
| Ex. 64 | PMMA | 64/ATH | 1/Tri-chlosan | $1.90 \times 10^5$ | $1.31 \times 10^5$ | 0.16 | 0.56 |
| Ex. 65 | PMMA | 63/ATH | 2/Tri-chlosan | $1.90 \times 10^5$ | $1.10 \times 10^5$ | 0.24 | 0.63 |
| control | UPE | 65/ATH | — | $1.90 \times 10^5$ | $4.85 \times 10^5$ | −0.41 | 0.00 |
| Ex. 66 | UPE | 63/ATH | 2/Tri-chlosan | $1.90 \times 10^5$ | $5.75 \times 10^4$ | 0.52 | 0.93 |
| control | EPOXY | 65/ATH | — | $1.90 \times 10^5$ | $2.49 \times 10^5$ | −0.12 | 0.00 |
| Ex. 67 | EPOXY | 63/ATH | 2/Tri-chlosan | $1.90 \times 10^5$ | $2.13 \times 10^4$ | 0.95 | 1.07 |

Of course, it should be understood that a wide range of changes and modifications can be made to the preferred embodiment described above. It therefore is intended that the foregoing detailed description be regarded as illustrative rather than limiting and that it be understood that it is the following claims, including all equivalents, which are intended to define the scope of this invention.

What is claimed is:

1. A method for restoring the antibacterial effectiveness of an antibacterial solid surface material comprising a matrix of at least one resin; at least one filler dispersed throughout the matrix; and at least one antibacterial agent dispersed throughout the matrix, wherein the solid surface material has an outer surface, at an initial time ($t_0$), with an initial antibacterial activity value within 24 hours of sample incubation ($\Delta t_0$@24 h) that is greater than zero, wherein at a first later time ($t_1$), wherein $t_1 > t_0$, the outer surface has a first later antibacterial activity value within 24 hours of sample incubation ($\Delta t_1$@24 h) wherein ($\Delta t_1$@24 h) is less than ($\Delta t_0$24 h), the method comprising: at a second later time ($t_2$), wherein $t_2 > t_1$, actively removing a portion of the outer surface of the solid surface material to provide a second outer surface on the solid surface material, the second outer surface having a second later antibacterial activity value within 24 hours of sample incubation ($\Delta t_2$@24 h) such that it satisfies the Equation I below:

$$(\Delta_{t2}@24\ h) > 0 \text{ and } (\Delta_{t2}@24\ h) > (\Delta_{t1}@24\ h) \qquad \text{Equation (I)}$$

wherein the active removal step can be repeated whenever necessary to restore the antibacterial effectiveness of the solid surface material, and wherein
(a) a reduction of antibacterial activity from time $t_0$ to $t_1$ includes exposure of the solid surface material to household cleaner,
(b) the one resin comprises acrylic,
(c) the filler comprises alumina trihydrate,
(d) the active removal step is by abrasion.

2. The method of claim 1 wherein the active removal step comprises sanding with an abrasive.

3. The method of claim 2 wherein the antibacterial agent comprises silver.

4. The method of claim 1 wherein the antibacterial agent is selected from zinc oxide powder; a mixture of zinc oxide and partially silver and sodium ion-exchanged zirconium phosphate; a mixture of zeolite and silver oxide/zinc oxide, a mixture of calcium phosphate and a compound selected from zinc oxide, silver-copper zeolites, silver-zinc zeolites and silver zeolites; silver, copper oxide and zinc silicate coated on titanium dioxide and overcoated with silica and aluminum hydroxide; zinc oxide coated with silver and overcoated with silica and aluminum hydroxide; silver coated on zinc oxide and overcoated with silica and aluminum hydroxide; and zinc phosphate and calcium phosphate with admixture of silver and silica.

5. The method of claim 1 wherein the resin comprises acrylic, the filler comprises aluminum trihydrate, the antibacterial agent comprises silver and the active removal step comprises sanding with an abrasive.

* * * * *